June 28, 1949.  J. M. VAN BEUREN  2,474,794
ATTENUATOR
Filed Jan. 17, 1944
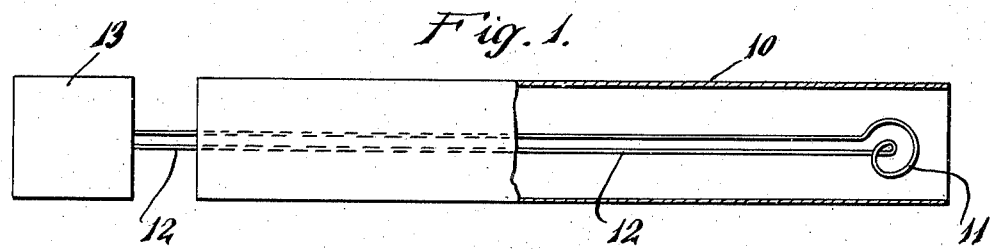
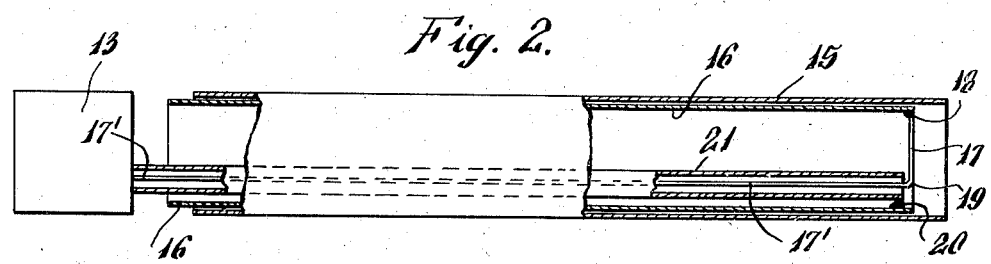
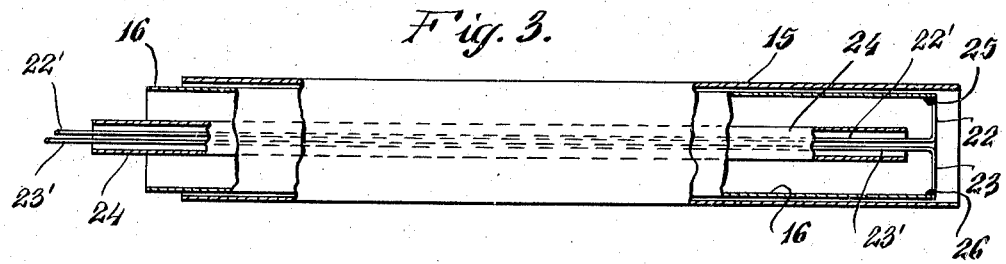
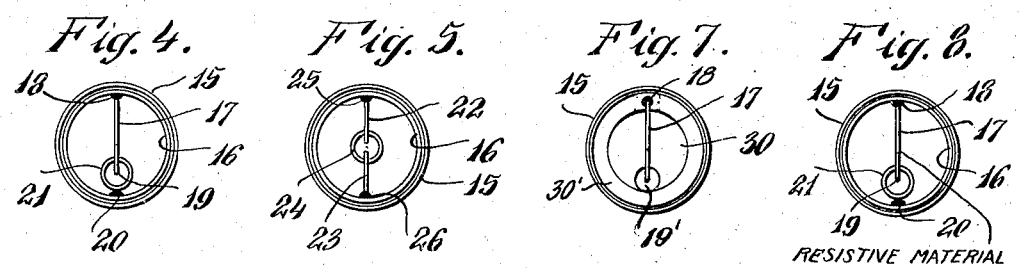
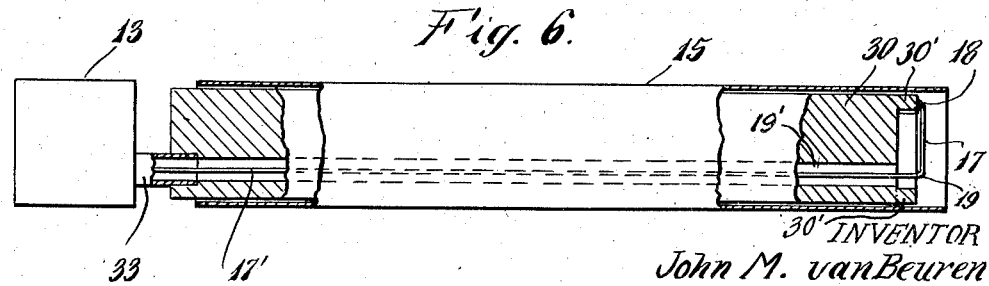
INVENTOR
John M. vanBeuren
BY Roger Williams
ATTORNEY Patented June 28, 1949

2,474,794

UNITED STATES PATENT OFFICE 2,474,794

ATTENUATOR

John M. van Beuren, Morristown, N. J., assignor to Measurements Corporation, Boonton, N. J.

Application January 17, 1944, Serial No. 518,645

5 Claims. (Cl. 178—44)

This invention relates to an attenuator, especially a type of attenuator employed in picking up radio frequency energy from a field.

One purpose of this invention is to afford an attenuator which can readily be used in making measurements, for example in connection with signal generators, noise meters and the like. However, this invention is equally applicable to attenuation control in many other types of radio frequency measurement.

Another purpose of this invention is to afford an attenuator in which the pickup circuit and transmission line connecting this pickup circuit with the indicating device are of relatively low impedance and consequently display relatively high efficiency. Actual measurements with this device have shown an increase in efficiency of from 100 to 200 per cent, over devices of the types hitherto employed in the art.

Reference is now made to the accompanying drawing, where:

Fig. 1 represents in longitudinal section an attenuator of one type hitherto employed in the art.

Fig. 2 represents in longitudinal section one embodiment of an attenuator in accordance with the present invention.

Fig. 3 represents, likewise in longitudinal section, an alternative form of attenuator according to this invention.

Fig. 4 is an end elevation, taken at the pickup end of the attenuator shown in Fig. 2.

Fig. 5 is an end elevation taken at the pickup end of the attenuator shown in Fig. 3.

Fig. 6 shows a modified form of the device of Fig. 2, in longitudinal section.

Fig. 7 is an elevational view of the device of Fig. 6, taken at the pickup end thereof.

Fig. 8 shows another modification of the device of Fig. 2, taken in elevation at the pickup end thereof.

Referring now to Fig. 1, element 10 represents an elongated metallic tube within which pickup coil 11 is located. Coil 11 is connected by transmission line 12 to any suitable indicating device, here represented at 13. Relative movement between pickup coil 11 and shield 10 will cause the pickup coil to assume a position at a predetermined distance from the open end, 14, of tube 10. As well known in the art, the tube 10 and coil 11 are placed in an electromagnetic field and the energy derived from this field will be altered as pickup coil 11 changes its distance from the open end of tube 10.

Referring now to Fig. 2, there is here shown an outer shielding tube 15, which performs the same general function as tube 10 of Fig. 1. Within tube 15 there is arranged a second metallic tube 16, which is of such diameter, compared with tube 15, as easily to slide therewithin. While tube 16 is illustrated as being in contact with tube 15, such contact is not essential and any suitable mechanical device may be employed to facilitate the sliding of one tube within the other.

Referring now additionally to Fig. 4, the end of tube 16 which lies near the active end of tube 15 is supplied with a conductor 17 extending from one point 18 on the periphery of the tube 16 to a point 19 diametrically opposite point 18, but not actually reaching the opposite point of the periphery of the tube. At point 19, conductor 17 is continued longitudinally of the tube and constitutes one conductor 17' of the transmission line. The other conductor of this line may be a hollow metallic tube 21 connected at the open end to the point on the periphery 16 which is diametrically opposite point 18, as indicated at 20. the longitudinal portion of conductor 17' may then be placed within such metallic tube, thus constituting a coaxial transmission line.

Referring now to Figs. 3 and 5, there are here shown two conductors 22 and 23 extending, at the active end of tube 16, from points 25 and 26 diametrically opposite upon the periphery of the tube. These conductors are turned longitudinally inward when they approach sufficiently close to one another at a point along the axis of tube 16 and constitute a transmission line 22', 23', of the parallel conductor type. Of course such transmission line may likewise be supplied with any suitable shielding, such as indicated by the tube 24.

In using the above described forms of attenuators, it is preferred that they be so placed that the pickup conductors, 17 in Fig. 2 and 22, 23 in Fig. 3, shall be transverse to the electromagnetic field in which the attenuator is placed. However, it may be found possible under some conditions to employ these attenuators with fields which are not transverse.

The action of the pickup conductors 17 and 22, 23 is to form a single low impedance loop by their connection with tube 16. Since tube 16 may be formed of a material having low resistance, and since the effective cross-section of tube 16 may be made comparatively great, it will be seen that the loop thus formed will present low impedance, compared with the conventional type of loop shown in Fig. 1.

As will be apparent to one skilled in the art, the form of attenuator shown in Fig. 2 is suited especially for connection to a measuring device adapted to have one input terminal thereof grounded. The form of attenuator shown in Fig. 3, on the other hand, is better adapted for use with a balanced type of indicating instrument, where both input terminals are balanced with respect to the ground.

For certain applications, the efficiency of the above-described forms of attenuators may be increased by using a resistance element in lieu of pickup conductor 17 in Fig. 2, or two such resistors in lieu of conductors 22, 23 in Fig. 3. Such resistors will usually be chosen so as to present a total resistance suitable as a terminating resistance for the surge impedance of the transmission line connected to such resistors.

Figure 8 shows an end elevation of a form having pickup conductors 17 formed of relatively high resistance material, the conductor then functioning at the same time as pickup and as line terminating resistor.

While I have described sliding element 16 as a tube, it can be seen that the interior space thereof not occupied by the various conductors and shields performs no useful functions and therefore this space may be filled with the material of which the tube is composed. Under these conditions, there will no longer be any need for the additional shielding tubes enclosing the transmission lines, such as tube 21 in Fig. 2, since element 16 will then act as sufficient shield.

In practice, a solid rod may have a longitudinal hole extending therethrough and corresponding in position and extent to the interior bore of tube 21, for example. In the case of the form of Fig. 3, the hole would be located along the central axis of such solid rod. Figs. 6 and 7 show an attenuator of the type shown in Fig. 2, but employing such a solid rod 30 in lieu of separate tubes 16 and 21, the rod having an extension tube 33, to shield the line 17', after this line leaves the rearward portion of the attenuator proper.

The peripheral portion 30' of rod 30 corresponds to the inner tube 16 of the form of Figure 2. Pickup conductor 17 is connected thereto at the point 18, by any suitable means, such as solder. As just explained, only that portion of the space existing, in the form of Figure 2, between the inner and outer tubes 21 and 16, which is free from conductors, may be filled in by metal. Therefore in producing the form of Figures 6 and 7 the portion of the rod between the periphery and the longitudinal channel 19' cannot be extended to touch pickup 17, as this would cause a self-evident short circuiting action.

It is quite evident that a rod with a longitudinal axial passageway extending therethrough may be considered merely as a hollow tube in which the walls are relatively thick, so that the employment of such rods is electrically equivalent to the employment of the tubes previously described, and the operation of this device is in no wise altered, when such rods are employed.

While I have illustrated my invention by the description of certain examples thereof and certain applications, such illustrations are not exclusive, and the scope of my invention is only limited by the hereunto appended claims, since many modifications and adaptations will be apparent to those skilled in the art.

I claim:

1. Electrical attenuator comprising two elongated coaxial conducting tubes, one sliding within the other, a coaxial shielded transmission line extending within the inner one of said tubes, in a longitudinal direction and adjacent to one wall of said inner tube, a measuring device connected to one end of said transmission line extending beyond the ends of said tubes, and a pickup conductor connected between the central conductor of said transmission line and a point upon the periphery of said inner tube, substantially 180 degrees removed from the portion of said tube which is most closely adjacent said transmission line, the outer conductor of said transmission line being connected to the portion of said inner tube to which it is most closely adjacent.

2. An attenuator according to claim 1, in which the connection of said outer conductor of said transmission line to said inner tube comprises a solid mass of metal filling the space therebetween not occupied by said pickup conductor, whereby short-circuiting of said pickup is avoided.

3. Electrical attenuator including a plurality of concentric conducting tubes, one sliding closely within the other, at least one pickup conductor extending substantially wholly radially and substantially completely across one end of the inner one of said tubes, said conductor having the periphery located extremity thereof electrically connected to a predetermined point upon the periphery of said inner tube and having the other extremity thereof bent substantially through 90 degrees and extending as a transmission line longitudinally of said inner tube, said longitudinal extension thereof being located adjacent the wall of said tube at a point substantially 180 degrees removed from said point of electrical connection, also including a conducting shield embracing substantially the entire longitudinal portion of said pickup conductor, said shield being connected at one end to a point upon said inner tube substantially 180 degrees removed from said point of electrical connection of said conductor, both conductor and shield being connected at the other end to said measuring device, whereby said longitudinally extending portion of said pickup conductor and said shield constitute a shielded coaxial transmission line, and whereby the active portion of said pickup conductor does not materially exceed in length the minimum distance between said transmission line and said inner tube, and does not extend substantially beyond the pickup end of said inner tube.

4. Electrical attenuator including a plurality of concentric conducting tubes, one sliding closely within the other, at least one pickup conductor extending substantially wholly radially and substantially completely across one end of the inner one of said tubes, said conductor having the peripherally located extremity thereof electrically connected to a predetermined point upon the periphery of said inner tube and having the other extremity thereof bent substantially through 90 degrees and extending as a transmission line longitudinally of said inner tube, emerging from the other end of said tube and connected to a measuring device, whereby the active portion of said pickup conductor does not materially exceed in length the minimum distance between said transmission line and said inner tube, and does not extend substantially beyond the pickup end of said inner tube, the radially extending portion of said pickup conductor including a terminating resistor proportioned to the surge impedance of the transmission line constituted by the longitudinally extending portion of said conductor, whereby transmission efficiency is increased, and whereby said resistor functions simultaneously as at least a portion of the pickup conductor.

5. Electrical attenuator including an outer substantially symmetrical conducting tube and a conducting eccentrically bored tube slidable therewithin, said inner tube having a longitudinal bore extending therethrough substantially along a line parallel with the axis of said inner tube but nearer a part of the surface thereof, an insulated transmission conductor extending through said longitudinal bore and bent substantially 90° at the active end thereof so as to cross one end of said inner tube, but insulated therefrom, the extremity of said active end of said conductor being connected to said inner tube at a point substantially 180° removed from the peripheral location of said bore along said inner tube and the other end of said conductor extending beyond the rear of the attenuator so as to be connected to a measuring device, whereby the inner surface of the bore of said inner tube functions as the outer shielding conductor of a coaxial transmission line.

JOHN M. van BEUREN.

REFERENCES CITED

The following references are of record in the file of this patent:

UNITED STATES PATENTS

| Number | Name | Date |
| --- | --- | --- |
| 2,204,179 | George | June 11, 1940 |
| 2,311,520 | Clifford | Feb. 16, 1943 |
| 2,345,642 | Varian | Apr. 4, 1944 |
| 2,404,542 | Sloan | July 23, 1946 |

FOREIGN PATENTS

| Number | Country | Date |
| --- | --- | --- |
| 116,110 | Australia | Nov. 4, 1942 |